United States Patent
Melnikov

(10) Patent No.: US 10,614,796 B2
(45) Date of Patent: Apr. 7, 2020

(54) METHOD OF AND SYSTEM FOR PROCESSING A USER-GENERATED INPUT COMMAND

(71) Applicant: YANDEX EUROPE AG, Lucerne (CH)

(72) Inventor: Ilia Alekseevich Melnikov, Moscow region (RU)

(73) Assignee: Yandex Europe AG, Lucerne (CH)

( * ) Notice: Subject to any disclaimer, the term of this patent is extended or adjusted under 35 U.S.C. 154(b) by 157 days.

(21) Appl. No.: 15/502,072

(22) PCT Filed: Mar. 5, 2015

(86) PCT No.: PCT/IB2015/051630
§ 371 (c)(1),
(2) Date: Feb. 6, 2017

(87) PCT Pub. No.: WO2016/030771
PCT Pub. Date: Mar. 3, 2016

(65) Prior Publication Data
US 2017/0229116 A1    Aug. 10, 2017

(30) Foreign Application Priority Data
Aug. 29, 2014    (RU) ................................ 2014135305

(51) Int. Cl.
*G10L 15/00* (2013.01)
*G10L 15/06* (2013.01)
(Continued)

(52) U.S. Cl.
CPC ........ *G10L 15/063* (2013.01); *G06F 9/45512* (2013.01); *G06F 16/433* (2019.01);
(Continued)

(58) Field of Classification Search
None
See application file for complete search history.

(56) References Cited

U.S. PATENT DOCUMENTS 7,930,168 B2    4/2011 Weng et al.
8,180,629 B2    5/2012 Rehberg
(Continued)

FOREIGN PATENT DOCUMENTS

KR    20110095236 A    8/2011

OTHER PUBLICATIONS

B. Nigam et al. "Comparative Study of Top 10 algorithms for Association Rule Mining" International Journal of Computer Science and Engineering 2017 vol. 5 issue 8 pp. 190-195.*
(Continued)

*Primary Examiner* — Bradley Smith
(74) *Attorney, Agent, or Firm* — BCF LLP

(57) ABSTRACT

A method of processing a user-generated input command executable at a computing apparatus includes, for each one of the plurality of machine-executable instructions, receiving a plurality of example expressions of the machine-executable instruction, generating a plurality of features for the plurality of example expressions, and analyzing the plurality of features associated with the plurality of example expressions to determine a plurality of feature patterns. The plurality of feature patterns is used to convert the user-generated input command into a machine executable output instruction, the machine executable output instruction being one of the plurality of machine-executable instructions. Systems for processing a user-generated command are also disclosed.

11 Claims, 5 Drawing Sheets

(51) Int. Cl.
*G06F 16/432* (2019.01)
*G06F 9/455* (2018.01)
*G06F 40/20* (2020.01)
*G06Q 10/10* (2012.01)
*G10L 15/18* (2013.01)
*G06F 9/00* (2006.01)

(52) U.S. Cl.
CPC ............. *G06F 40/20* (2020.01); *G06Q 10/10* (2013.01); *G10L 15/1815* (2013.01); *G06F 9/00* (2013.01)

(56) References Cited

U.S. PATENT DOCUMENTS

| | | |
|---|---|---|
| 2002/0069197 A1 | 6/2002 | Katayama et al. |
| 2007/0162281 A1 | 7/2007 | Saitoh et al. |
| 2008/0052076 A1 | 2/2008 | Metz |
| 2009/0089058 A1 | 4/2009 | Bellagarda |
| 2010/0070268 A1 | 3/2010 | Sung |
| 2010/0175049 A1 | 7/2010 | Ramsey et al. |
| 2011/0213737 A1 | 9/2011 | Baughman |
| 2011/0301955 A1 | 12/2011 | Byrne et al. |
| 2012/0053946 A1 | 3/2012 | Bellegarda |
| 2014/0236657 A1 | 8/2014 | Liang et al. |

OTHER PUBLICATIONS

International Search Report from PCT/IB2015/051630, dated Jul. 9, 2015, Blaine R. Copenheaver.

Ozsevim, Comparison of Different Algorithms for Exploting the Hidden Trends in Data Sources, Jun. 2003, A Dissertation Submitted to the Graduate School in Partial Fulfillment of the Requirements for the Degree of Master of Science, Izmir Institute of Technology, 113 Pages.

English abstract of KR 20110095236 retrieved from Espacenet on Jan. 10, 2017.

European Search Report from EP 15834883 dated Jul. 6, 2017; Ebert, Werner.

* cited by examiner

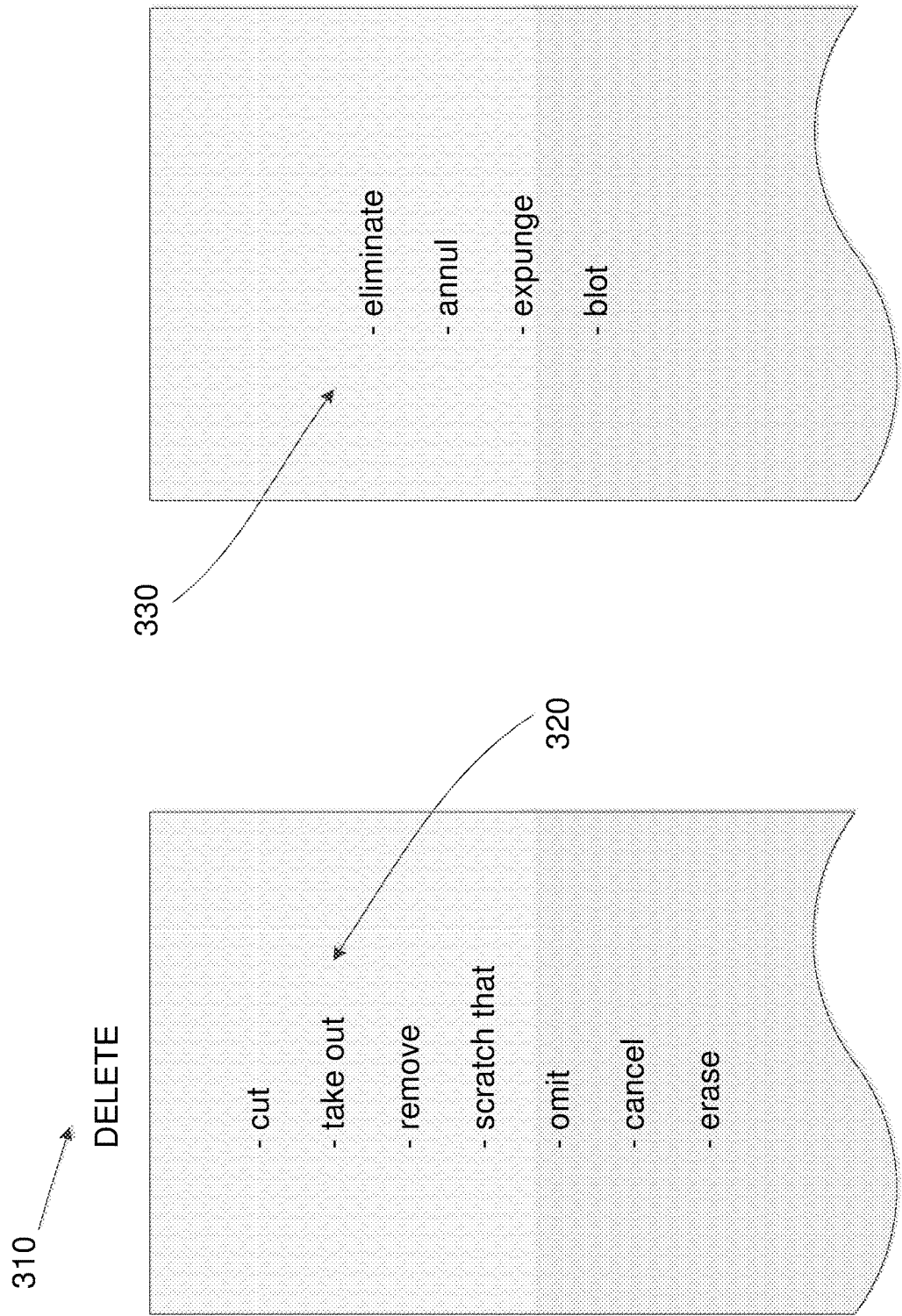

METHOD OF AND SYSTEM FOR PROCESSING A USER-GENERATED INPUT COMMAND

CROSS-REFERENCE

The present application claims priority to Russian Patent Application No. 2014135305, filed Aug. 29, 2014, entitled "METHOD OF AND SYSTEM FOR PROCESSING A USER-GENERATED INPUT COMMAND" the entirety of which is incorporated herein.

FIELD

The present technology relates to methods and systems for processing a user-generated input command.

BACKGROUND

Natural language processing (NLP) is used in many different applications where a user interacts with a machine via speech (i.e. by issuing one or more spoken commands). An example of such an application includes voice-activated control systems for various kinds of devices such as smartphones, televisions, household appliances, and the like. Automated assistance at call centers and switch boards, provide another example of application for NLP. The NLP application receives user-generated speech as input, converts the speech into text, and then determines the part of the received text that includes commands or operations that the user would like to have executed, and then accordingly generates machine-executable instructions.

Improving the performance of the NLP application depends on improving the accuracy and efficiency of processing the user-generated speech and the text derived therefrom. The received user-generated text is tagged with features or tags to help determine the meaning and commands embedded in the text. The tags or features are generated by using some large body of text ("text corpus") in which each word has been manually assigned with features. In order to improve accuracy of the NLPA, the size of the tagged text corpus is increased. This is very resource intensive, and cannot be done quickly or easily.

There is therefore a need for improving the ability to process user-generated speech more efficiently and less resource intensively.

SUMMARY

It is an object of the present technology to ameliorate at least some of the inconveniences present in the prior art.

Embodiments of the present technology have been developed based on inventors' appreciating that there exists at least one problem or an area for improvement associated with the prior art solutions.

As such, according to a first broad aspect of the present technology, there is provided a method of processing a user-generated input command executable at a computing apparatus includes, for each one of the plurality of machine-executable instructions, receiving a plurality of example expressions of the machine-executable instruction, generating a respective feature for the plurality of example expressions, and analyzing the plurality of features associated with the plurality of example expressions to determine a plurality of feature patterns. The plurality of features includes the feature for each of the plurality of example expressions. The plurality of feature patterns is used to convert the user-generated input command into a machine executable output instruction, the machine executable output instruction being one of the plurality of machine-executable instructions.

In another implementation, said analyzing includes obtaining an occurrence count for each of the plurality of features, and analyzing the plurality of features after discarding therefrom, a low occurrence feature of the plurality of features, the low occurrence feature having an occurrence count being smaller than a threshold occurrence count.

In another implementation, said analyzing comprises analyzing using a Charm Bitset algorithm.

In another implementation, said generating the plurality of features for each one of the plurality of example expressions includes generating the plurality of features based on a predetermined rule.

In another implementation, said generating the plurality of features for each one of the plurality of example expressions includes generating the plurality of features based on a statistical model.

In another implementation, the statistical model is one of: a Hidden Markov Model; and a conditional random field model.

In another implementation, the method includes generating, by the computing apparatus, an additional example expression for a command of the plurality of commands; and including the generated additional example expression in the plurality of example expressions for each machine-executable instruction of the plurality of machine-executable instructions.

In another implementation, the method includes, before including the generated additional example expression in the plurality of example expressions, presenting the generated additional example expression to a training administrator. Responsive to said presenting, a validation is received from the training administrator, for the generated additional example expression, the validation being indicative of a validity of the generated additional example expression.

In another implementation, said including the generated additional example expression in the plurality of example expressions is further responsive to the validation being indicative of the generated additional example expression being a valid expression.

In another implementation, said including the generated additional example expression in the plurality of example expressions comprises associating the validation received for the generated additional example expression with the generated additional example expression.

In another implementation, said generating of the additional example expression includes accessing an external resource communicatively coupled with the computing apparatus.

In another implementation, the external resource is a network resource communicatively coupled with the computing apparatus, and the method includes crawling the network resource to obtain information for generating the additional example expression.

In another implementation, the method includes receiving the user-generated input command and using the plurality of feature patterns to convert said user generated input command into the machine-executable output instruction.

In another implementation, the feature associated with one of the plurality of expressions is indicative of one of: a grammar element, a root of a word related to the example expression, a normalized form of the word, a punctuation element, a word separator, and a command.

In another implementation, a feature weight is assigned to each feature of the plurality of features.

According to another broad aspect of the present technology, there is provided a system for processing a user-generated input command. The system includes a communication interface for receiving a plurality of example expressions of a machine-executable instruction of a plurality of machine executable instructions, and a training module communicatively coupled to the communication interface and having a processor configured to generate a plurality of features for the plurality of example expressions of the machine-executable instruction, and analyze the plurality of features associated with the plurality of example expressions of the machine-executable instruction to determine a plurality of feature patterns for the of the machine-executable instruction. The plurality of feature patterns is used to convert a user-generated input command into a machine executable output command, the machine executable output instruction being one of the plurality of machine executable instructions.

In another implementation, the training module is communicatively coupled to an external resource, and the processor is further configured to generate an additional example expression for a machine-executable instruction of the plurality of machine-executable instructions, and include the generated additional example expression in the plurality of example expressions.

In another implementation, the training module is coupled to an external resource, the generated additional example expression being generated by accessing the external resource.

In another implementation, the external resource is a network resource, and the training module is coupled to a crawling module configured to crawl the network resource.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, a "network resource" is any data or collection of data that can be provided by a publisher over a network and that is associated with a network resource address. Non-limiting examples of network resources include HTML pages, documents, images, video, feed sources, as well as pluralities of files such as the foregoing. Network resources may include content, such as words, phrases, pictures, and so on, and/or embedded information such as metadata, hyperlinks and/or embedded instructions (such as JavaScript scripts).

In the context of the present specification, "client device" or "electronic device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 3A is an exemplary illustration of a machine-executable instruction and example expressions thereof;

FIG. 3B is an exemplary illustration of generated additional example expressions for the machine-executable instruction of FIG. 3A;

DETAILED DESCRIPTION

Figure 1:
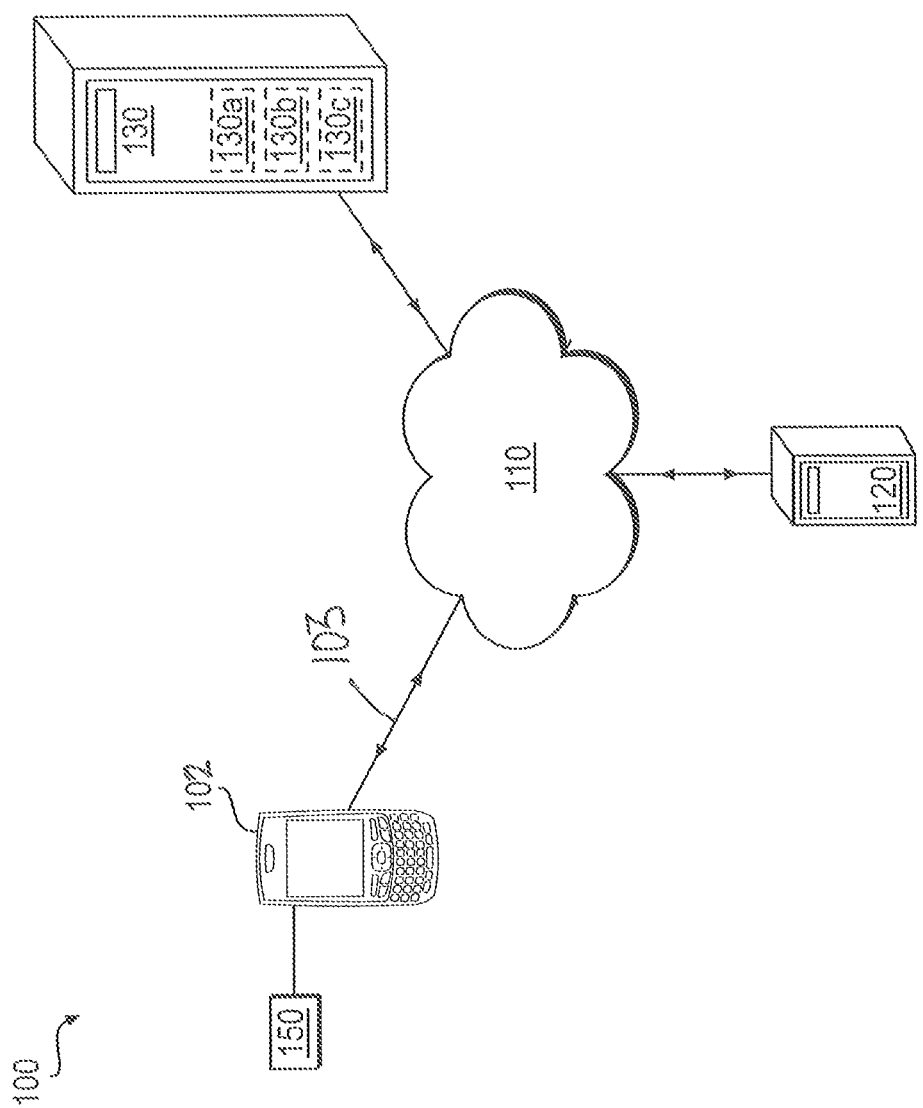
FIG. 1 is a schematic illustration of a network environment in accordance with non-limiting embodiments of the present technology.

With reference to FIG. 1, there is shown a schematic diagram of a network environment 100 suitable for implementing non-limiting embodiments of the present technology. It is to be expressly understood that the network environment 100 is depicted merely as an illustrative implementation of the present technology. Thus, the description thereof that follows is intended to be only a description of illustrative examples of the present technology. This description is not intended to define the scope or set forth the bounds of the present technology.

In some cases, what are believed to be helpful examples of modifications to the network environment 100 may also be set forth below. The modifications are described merely as an aid to understanding, and again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the network environment 100 may provide in certain instances simple implementations of the present technology, and that where such is the case they have been presented in this manner as an aid to understanding. As persons skilled in the art would understand, various implementations of the present technology may be of a greater complexity.

The network environment 100 includes an electronic device 102 coupled to a communications network 110 via a communication link 103.

The electronic device 102 is typically associated with a user (not depicted) and, as such, can sometimes be referred to as a "client device". In the illustrated embodiment, the electronic device 102 is a smartphone 102. The implementation of the electronic device 102 is however not limited to a smartphone 102. As an example, the electronic device 102 may be implemented as a personal computer (desktops, laptops, netbooks, etc.), a wireless electronic device (a tablet and the like), as well as network equipment (a router, a switch, or a gateway). The general implementation of the electronic device 102 is known in the art and, as such, will not be described here at much length.

Although the present description is made with reference to the network environment 100 having one electronic device 102, it should be understood that the network environment 100 could include more than one electronic device 102. The number of electronic devices is not limited to the two depicted herein.

The electronic device 102 includes a user input interface (such as a keyboard, a mouse, a touch pad, a touch screen, microphone, and the like) for receiving user inputs. The electronic device 102 includes a user output interface (such as a screen, a speaker, a printer and the like) for providing visual, auditory or tactile outputs to the user. The electronic device 102 includes a network communication interface (such as a modem, a network card and the like) for two-way communication over the communications network 110 via the communication link 103. The electronic device 102 also includes a processor coupled to the user input interface, the user output interface and the network communication interface. The processor is configured to execute various methods, including those described herein below. To that end the processor may store or have access to computer readable commands which, when executed, cause the processor to execute the various methods described herein. The electronic device 102 comprises hardware and/or software and/or firmware, as is known in the art, to execute various applications. The electronic device 102 has some applications, such as a dictation application 150, which are configured to receive user-generated speech as input and execute or cause execution of one or more machine-executable instructions responsive to the received user-generated speech. The electronic device 102 also has applications configured to receive and transmit information via the communication network 110. Examples of such applications include, the dictation application 150, a browser application, a music streaming application, a photo sharing application, and the like.

In the illustrated embodiment of the present technology, the communications network 110 is implemented as the Internet. In other embodiments of the present technology, the communications network 110 can be implemented differently, such as in the form of a wide-area communications network, a local-area communications network, a private communications network and the like.

The communication link 103 can also have various non-limiting implementations, and the particular implementation(s) of the communication link 103 for the electronic device 102 will depend on how the electronic device 102 is implemented. In the illustrated embodiment, the communication link 103 for the electronic device 102 can be either wireless (such as the Wireless Fidelity, or WiFi® for short, Bluetooth® or the like) or wired (such as a Universal Serial Bus or USB-based connection). Furthermore, the communication link 103 coupling the electronic device 102 to the communication network 110 could also include more than one type of link. For example, the smartphone 102 could be coupled to the network 110 via wireless as a well as a wired connection.

It should be expressly understood that implementations for the electronic device 102, the communication link 103, and the communications network 110 are provided for illustration purposes only. As such, those skilled in the art will easily appreciate other specific implementational details for the electronic device 102, the communication link 103, and the communications network 110. The examples provided herein are not meant to limit the scope of the present technology.

Also coupled to the communications network 110 is an application server 120. The application server 120 is connected to a subset of the electronic devices connected to the communication network 110. For example, in the illustrated embodiment of the network environment 100, the application server 120 is coupled to the electronic device 102. The application server 120 could also be connected to other servers, such as but not limited to network resource servers, application servers, and other network configuration servers, via the communication network 110.

The application server 120 can be implemented as a conventional computer server. In an example of an embodiment of the present technology, the application server 120 can be implemented as a Dell™ PowerEdge™ Server running the Microsoft™ Windows Server™ operating system. The application server 120 could also be implemented as other kinds of network equipment such as, but not limited to, a router, a switch, or a gateway, a base station and the like. The application server 120 could be implemented in any suitable hardware and/or software and/or firmware, or a combination thereof. In the depicted non-limiting embodiment of present technology, the application server 120 is a single server. In alternative non-limiting embodiments of the present technology, the functionality of the application server 120 could be distributed and may be implemented via multiple servers. The implementation of the application server 120 is well known. However, briefly speaking, the application server 120 comprises a communication interface (not shown) structured and configured to communicate with the electronic device 102, and other devices coupled to the communications network 110. The application server 120 further comprises at least one computer processor (not shown) operationally connected with the communication interface and structured and configured to execute various processes to be described herein.

The network environment 100 also includes a network resource server 130 hosting three network resources 130*a*, 130*b*, 130*c* that can be accessed by connecting to the network resource server 130 via the communication network 110. The network resource server 130 could be implemented as a conventional computer server. In an example of an embodiment of the present technology, the network resource server 130 could be implemented as a Dell™ PowerEdge™ Server running the Microsoft™ Windows Server™ operating system. The network resource server 130 could also be implemented in any other suitable hardware and/or software and/or firmware or a combination thereof. In the depicted non-limiting embodiment of present technology, the network resource server 130 is a single server. In alternative non-limiting embodiments of the present technology, the functionality of the network resource server 130 may be distributed and may be implemented via multiple servers. It should also be understood that the network resource server 130 and the network resources 130*a*, 130*b*, 130*c* hosted by the network resource server 130 as presented herein is exemplary. The network environment 100 could include any number and kind of network resource servers 130 and each network resource server 130 could host any number and kind of network resources.

In the illustrated embodiment, for convenience and simplification of description of the present technology, the network resource server 130 is assumed to be a web-resource server and the network resources 130*a*, 130*b*, 130*c*, hosted by the network resource servers 130 are assumed to be web resources (or websites). It should however be understood, that the present technology is no way limited to web resource servers and web resources.

Natural Language Processing Application

In the context of the present description, a natural language processing application is an application which converts a user-generated commands 300 (FIG. 2) into a machine-executable instruction 310, and vice versa. The description below is provided with reference to a dictation application 150, in which user-generated speech received as input is converted to text and processed to detect a command 300 embedded within the text and convert the commands to a machine executable instruction 310.

With reference to FIG. 1, the dictation application 150 is provided on the electronic device 102 to enable the user (not shown) of the electronic device 102 to input speech via a microphone of the electronic device. The text input by the user of the electronic device 102 comprises dictated text content that the user wants transcribed into a document. The input speech also includes one or more user-generated input commands 300 to be executed or operated on the dictated text content.

While using the dictation application 150, a user may want to perform operations such as, but not limited to: add to a document, edit sentence, delete a word, save a document, continue a paragraph, begin on the next page, open a saved document, create a new document, and the like. The desired operations include a command (edit, add, save, create, etc. . . . ) and objects on which the operations are to be performed (word, sentence, document, page, etc. . . . ) One of the challenges for the dictation application 150 is to identify the user-generated commands 300 embedded in the speech input by the user. The other challenge is to resolve ambiguities in the speech input by the user.

For each of the operations, a request for execution of the operation can be expressed in many different ways by the user of the application. For example, the operation "add" can be requested by using commands such as "put in", "combine", "insert", and other such word(s). In order to execute the requested operation, the processor requires instruction(s) in a specific form that are specific to the particular programming language in which the operating system for the processor is implemented. The dictation application 150 thus needs to convert the user-generated commands 300 embedded in the input received from the user to machine-executable instructions 310. The dictation application 150 therefore needs to learn different natural language expressions for each machine-executable instruction 310.

In general, dictation application is implemented by a natural language processing module (not shown). In this implementation, the natural language processing module is integrated with the processor of the electronic device 102. In some other alternative implementations, the natural language processing module is integrated with a server, such as the application server 120. In some other embodiments, a portion of the natural language processing module can be partly integrated with the electronic device 102, and another portion of the natural language processing module is integrated with the application server 120. The natural language processing module includes a combination of hardware and/or software and/or firmware for operation of the dictation application 150. The processor includes a speech recognition unit that detects and converts detected speech into text data, an analyzer for analyzing the text data as will be described below, and a parser for converting the analyzed text data to one or more machine executable instructions 320.

Figure 4B:
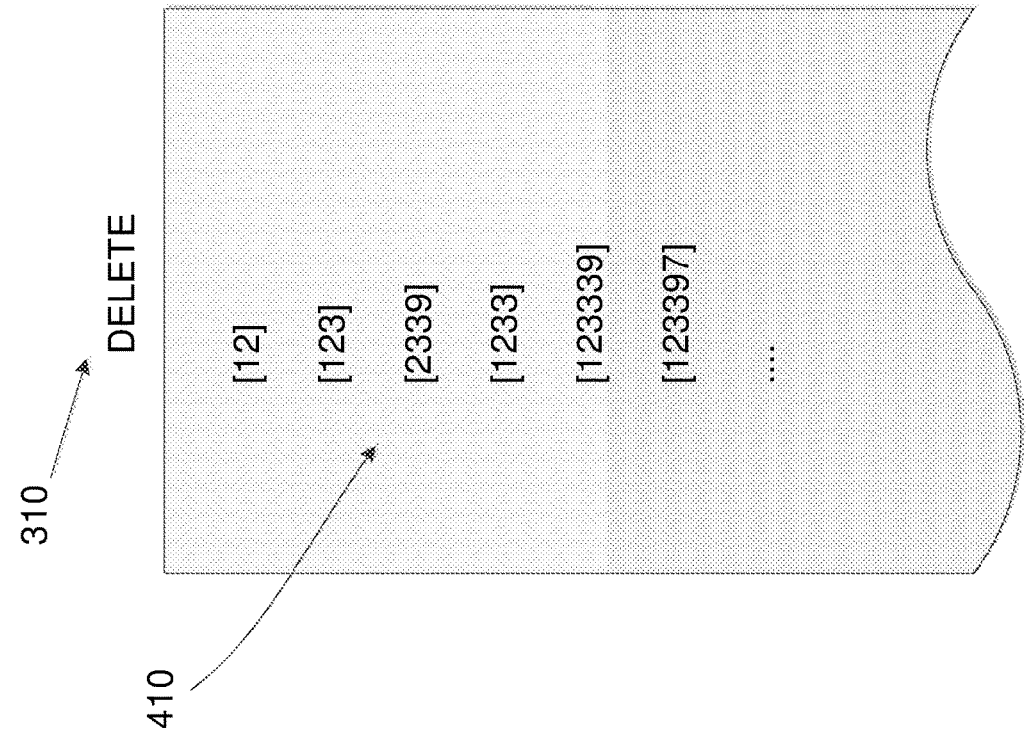
FIG. 4B is an exemplary illustration of the machine-executable instruction of FIG. 3A and the feature patterns associated therewith.
Figure 4A:
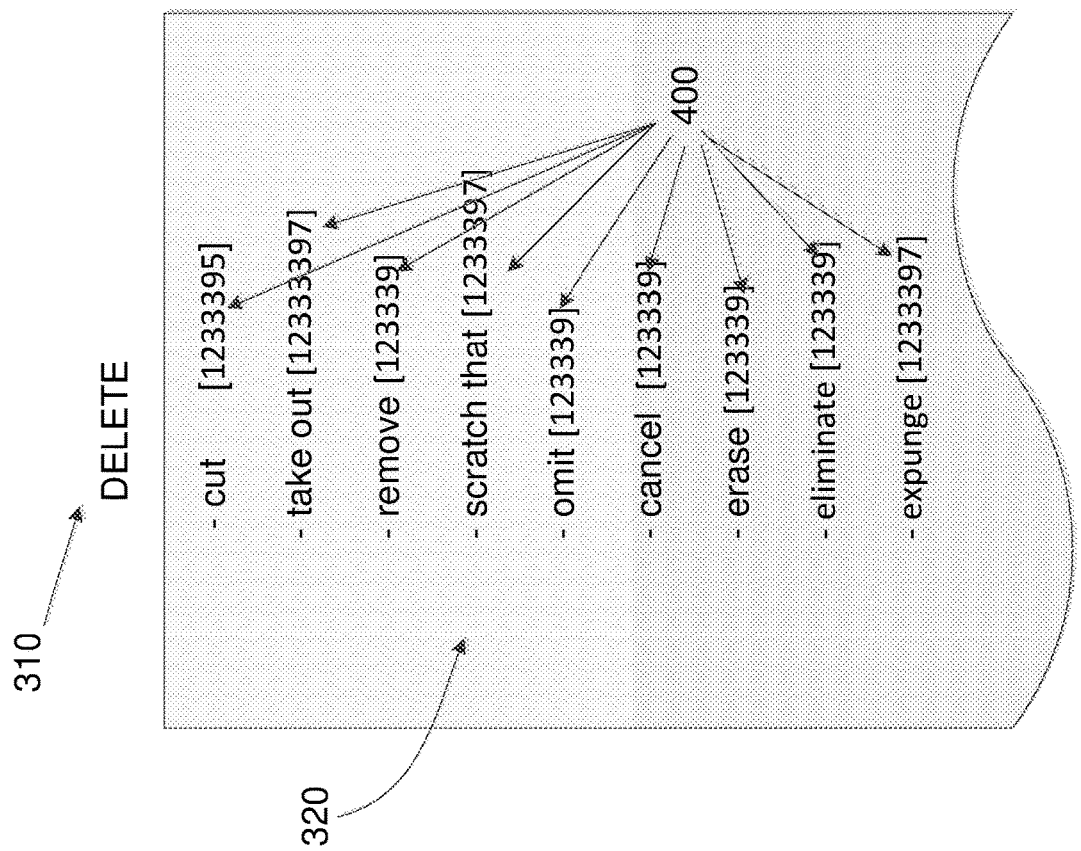
FIG. 4A is an exemplary illustration of the machine-executable instruction and example expressions of FIG. 3A and features generated therefor.
Figure 5:
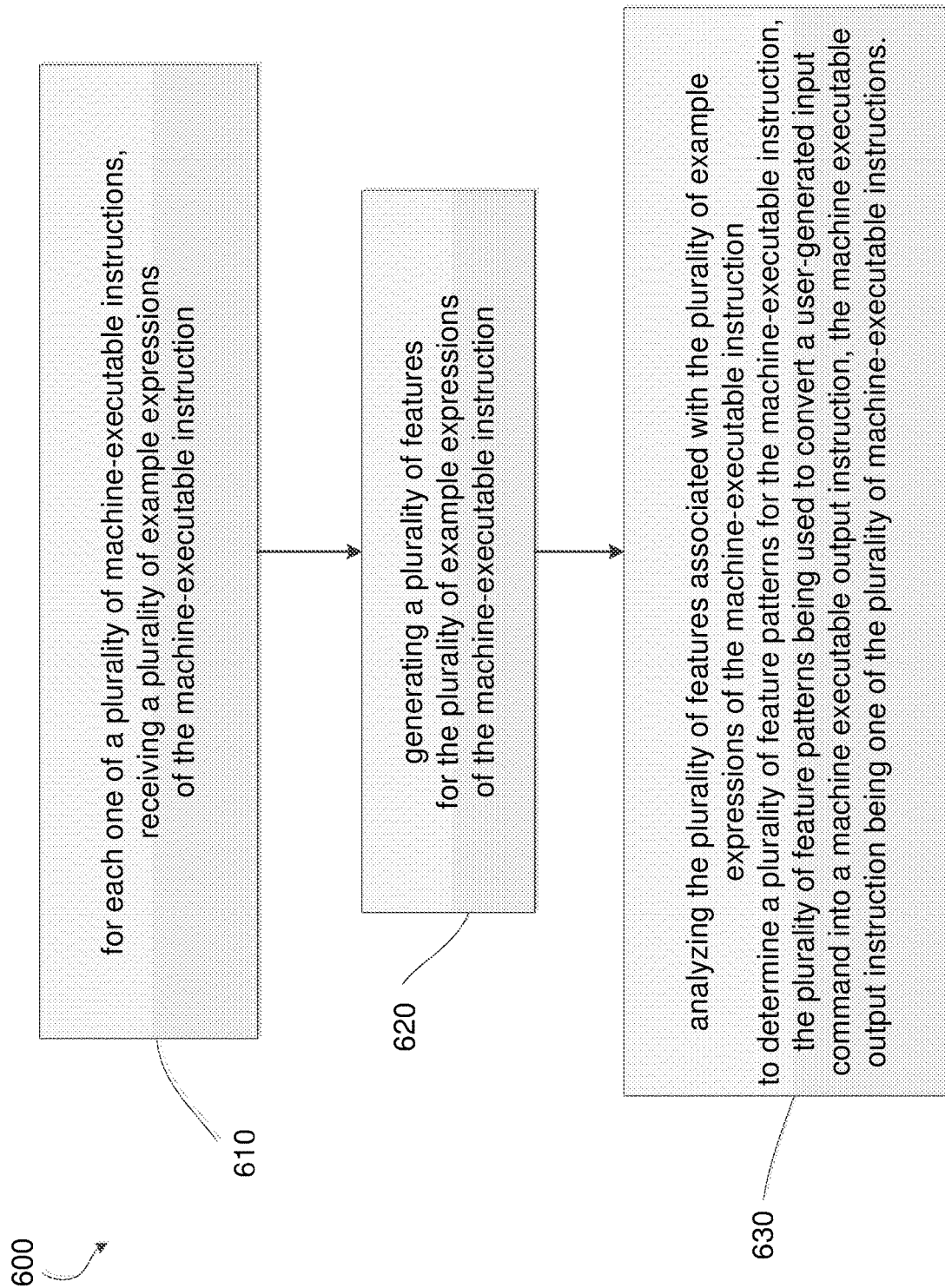
FIG. 5 is a flow chart of a method for natural language processing according to an embodiment of the present technology.

The dictation application receives as input speech which may include one or more commands to perform operations such as, but not limited to: add, edit, delete, save, continue a document, open a saved document, create a new document, and the like. As mentioned above, the input speech is converted to text data by a speech-to-text converter. The dictation application 150 then analyzes the text data. The analysis of the text data comprises assigning features 400 (FIG. 4A) to each of the words in the text data.

The features 400 are descriptors for the words, and include part-of speech descriptors such as verb, noun, singular, plural, subjunctive, infinitive, and the like. The features may also include descriptors such as "command" or "not command" for identifying whether the word is an acceptable form of a command.

In some implementations, different types of features 400 are assigned to each word. Examples of types of features include the word as is, the normalized form of the word, a grammar element or part-of speech, a common root of the word, punctuation, word separator, command, not a command, and the like. Each type of feature can be represented symbolically, for example, by a number or a hash value. In some implementations, the features are assigned weights which are indicative of the importance of the feature type for processing the user-generated input command 300. In some implementations, the weights are assigned manually, and in other implementations, the weights are assigned automatically with the help of machine learning routines.

For example, the word as is could be represented by "1", and assigned a weight of 5.0; the normalized form of the word could be represented by "2", and assigned a weight of "5.0" the feature type "grammar element" could be represented by the number "3" and assigned a weight of 1.0, the feature type "command or not command" could be represented by the number "9" and assigned a weight of 3.0, and so on and so forth. Each word is also assigned a value for each type of feature 400. Thus, for the word "delete", feature types assigned could be [1, 2, 3, 3, 9] with respective values [delete, delete, verb, present, command] and respective weights [5, 5, 1, 1, 3].

The features 400 are assigned to a word based on a morphological and lexicological analysis of the word, and taking into account the neighboring words. In some implementations, if a particular word(s) could have more than one meaning, then the dictation application 150 looks at the features 400 of the neighbouring words in order to assign features 400 to that word.

The input text data is analyzed by comparing to a training set of data. The comparison is made by determining an intersection between the features 400 of the words of the input text and the feature patterns 410 stored in a feature pattern database provided by a training module 220, and that of the input text data. The accuracy of the dictation application 150 increases with the size of the feature pattern database, and/or with its ability to use the available feature patterns to correlate a particular machine-executable instruction 310 with different possible user-generated commands 300.

Figure 2:
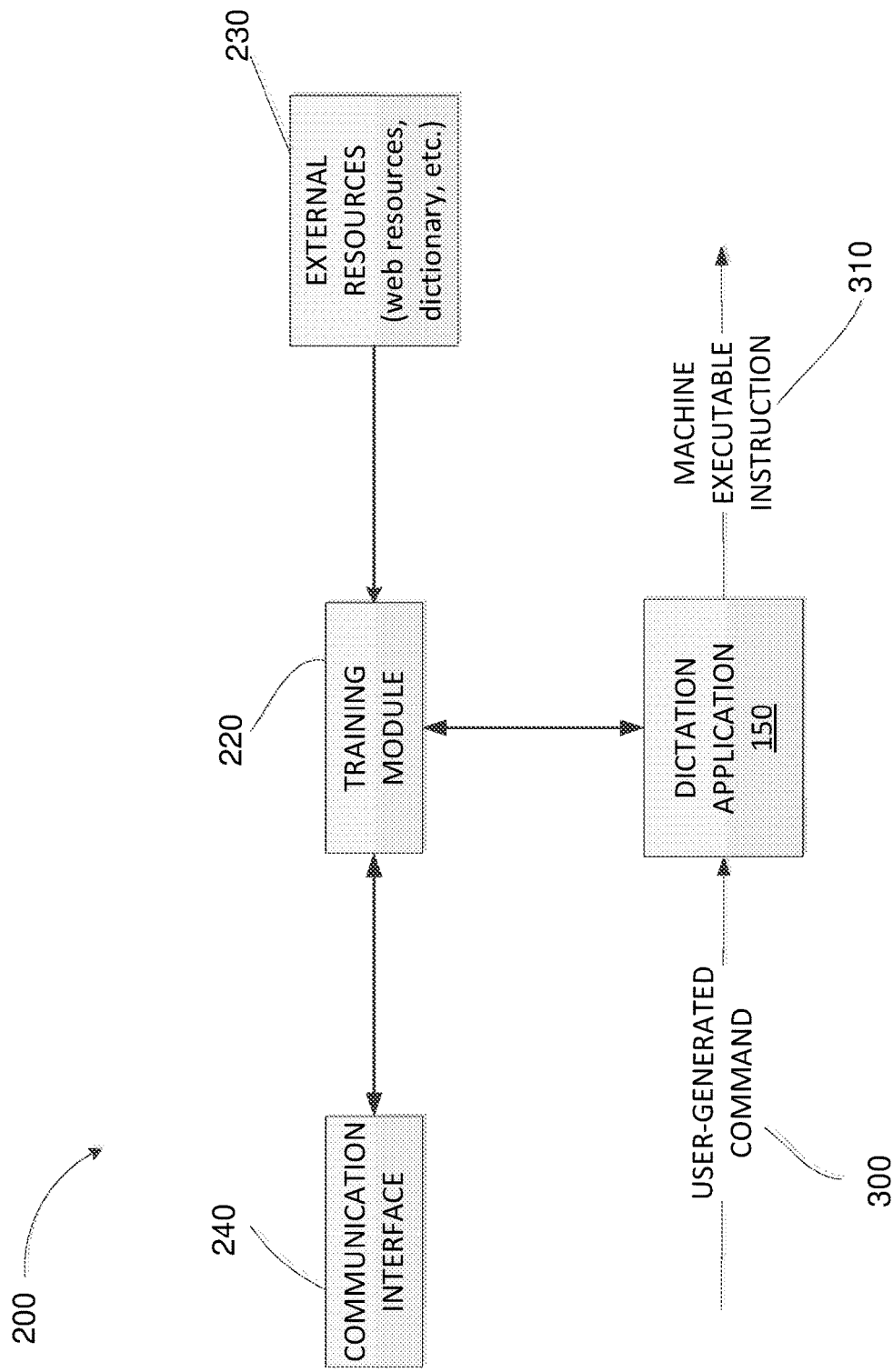
FIG. 2 is a schematic block diagram showing a system in accordance with non-limiting embodiments of the present technology processing user-generated commands implemented in the network environment shown in FIG. 1.

With reference to FIG. 2, the dictation application 150 is operatively connected to the training module 220 for learning different user-generated commands 300 associated with a machine-executable instruction 310, and to learn different feature patterns 410 associated with each machine-executable instruction 310 as will be described below.

In the illustrated non-limiting embodiment, the training module 220 is integrated with the dictation application 150. Thus in the illustrated embodiment, the training module 220 is integrated with the electronic device 102. In some other alternative embodiments, the training module 220 is integrated with a server, such as the application server 120. In some other embodiments, a portion of the training module 220 is integrated with the electronic device 102, and another portion of the training module 220 is integrated with the application server 120. The training module 220 includes a combination of hardware and/or software and/or firmware for the execution of various tasks related to training of the dictation application 150 as will be described below. The training module 220 is also operatively coupled to resources 330 for accessing information. The resources 330 could be external resources such as network resources such as web-pages, databases, and the like. The resources 230 could also be locally stored or integrated with the training module 220. Fir example, a dictionary, or a thesaurus could be stored locally on a memory storage device of the training module 220. The training module 220 is also coupled to a communication interface 240 by which can communicate with a training administrator.

The training administrator is a human operator that interacts with the training module 220 for the creation of the feature patterns 410 and example expressions 320 associated with different machine-executable instructions 310.

Although, the description herein will be provided with reference to the dictation application 150, it should however be understood that the methods and systems of the present technology are not limited to the dictation application 150, but could be applied to any natural language processing application which processes natural language. For example, the natural language processing application could be an automated call directing application implemented that receives speech input by a caller, processes the received input speech to determine the caller's request, and accordingly directs the phone call to the appropriate location. As another example, the natural language processing application could be a voice-activated control system for a television, a text-to-speech application for converting text to speech, and the like.

Method

A method 600 of the present technology for processing a user-generated input command 300 will now be described with reference to FIGS. 3A to 5.

As mentioned above, the processing of the user-generated input command 300 can be used in the context of a natural language processing application, such as the dictation application 150 which converts a user-generated input command 300 received as input to a machine-executable instruction 310. The machine executable instruction 310 is output to an entity that will execute or cause execution of the machine executable instruction 310. The dictation application 150 converts a user-generated input command 300 received as input to a machine executable instruction 310 which is output to the processor of the electronic device 102.

The method 600 will be described in the context of the dictation application 150, however, as mentioned above the method 600 is not limited to a dictation application 150, but can be used with any natural language processing application that causes execution of one or more machine executable instructions 310 in response to receiving one or more user-generated input commands 300.

The method 600 is executed by the training module 220. The method 600 begins at step 610 when the training module 220 receives a plurality of example expressions 320 for each machine-executable instruction 310 of a plurality of machine-executable instructions. In some implementations, the plurality of example expressions 320 is received from a training administrator. Each example expression 320 is a word or a phrase that can be used to express machine-executable instruction 310 in normal human language. In other words, each example expression 320 is a possible user-generated input command 300.

For example, for the machine-executable instruction 310 "delete", the training administrator enters a list of example expressions 320 as shown in FIG. 3A. Each of the example expressions 320 describes the operation "delete" in normal human language. Each example expression 320 could have one word, or a plurality of words. Thus, each example expression 320 could be a word or a phrase.

Similarly, the training administrator can enter a list of example expressions 320 for a plurality of machine-executable instructions 310 that are executable by the computing apparatus. As mentioned above, the list of machine-executable instructions 310 could include instructions such as "add", "show", and the like. The particular list of machine-executable instructions 310 for which the training module 220 receives example expressions 320 could be particular to the particular implementation of the natural language processing application. For example the list of machine-executable instructions 310 could be different for a call center application compared to the dictation application 150.

At step 620, features 400 are generated for each of the plurality of example expressions received at step 610. The features 400 have been discussed above. In some implementations, the features 400 are generated using predetermined rules. For example, if the word "book" is preceded by "a", the word book is assigned a value "noun" for the feature type "grammar element". In some implementations, the features 400 are generated using algorithms based on statistical models such as Hidden Markov Model and/or a conditional random field (CRF), and the like. Each example expression 320 is associated with a set of features 400. For example, with reference to FIG. 4A, the word "remove" is assigned a set of features [123339].

In order to assign features 400, each example expression 320 is divided into units comprising a word or a group of words, and then the features 400 are assigned to each unit of the example expression. For example, in some implementations of the method 600, the example expression "cut the sentence", is divided into units "cut", "the" and "sentence" and respectively assigned features 400 [122], [48], and [346]. In some other implementations of the method 600, the example expression could be divided into units "cut" and "the sentence" and assigned features 400 [122] and [3468].

At step 630, the features 400 associated with the example expressions 320 for a particular machine-executable instruction 310 are analyzed to determine feature pattern(s) 410 (FIG. 4B) for that machine-executable instruction 310. The features 400 of the example expressions 320 are analyzed using pattern mining algorithms, such as, but not limited to, the Charm Bitset algorithm. It is contemplated that any suitable pattern mining algorithm could be used to determine feature patterns 410 associated with each machine-executable instruction 310. Thus, as step 630, each of the plurality of machine executable instructions 300 is associated with a plurality of feature patterns 410. The feature patterns 410 associated with each command are indicative of the occurrence of particular features 400 in combination with other features 400 for that machine-executable instruction 310.

By analysing the features 400 associated with the example expressions 320 for the plurality of machine-executable instructions 310 and obtaining feature patterns 410 associated with each machine executable instruction 310, the training module 220 learns the rules for the occurrence of particular features 400 in combination with other features 400. The size of the database of feature patterns 410 available to the dictation application 150 can be increased by adding additional examples 320 of usage for a particular machine-executable instruction(s) 310, and then pattern mining the features 400 associated with the example expressions 320 for that particular machine-executable instruction(s) 310 without having to pattern mine an entire text corpus, which is a much more resource intensive task.

In some implementations, before mining the plurality of features 400 associated with the plurality of example expressions 320 to determine feature patterns 410 for a machine-executable instruction 310, low occurrence features 400 are discarded from the plurality of features 400 associated with plurality of example expressions 320 for that machine-executable instruction 310. Thus, features 400 that appear rarely in the example expressions 320 for a particular machine-executable instruction 310 are discarded before mining the plurality of features 400 associated with the example expressions 320 to determine feature patterns 410 associated with that machine-executable instruction 310. Thus, in some implementations, the number of occurrences (occurrence count) of a feature 400 in the plurality of features 400 associated with the plurality of example expressions 320 for a machine-executable instruction 310 is counted. If the occurrence count of a feature 400 is lower than a threshold occurrence count, that feature 400 is discarded or deleted form the plurality of features 400 assigned for the features 400 associated with the plurality of example expressions 320 that machine executable instruction 310.

In some implementations, one or more additional example expressions 330 generated by the training module 220 for one or more of the machine-executable instructions 310. The additional example expressions 330 generated for a particular machine-executable instructions 310 are then included in the plurality of example expressions 320 for that machine-executable instruction 310.

The additional example expressions 330 are generated by obtaining words and phrases having a similar meaning as the machine-executable instruction 310, or one of the example expressions 320 thereof. The training module 220 accesses one or more resources 230 such as a dictionary, a thesaurus, a networked resource such as the web resources 130*a*, 130*b*, 130*c*, and the like in order to generate the additional example expressions 330. For the example scenario of FIGS. 3A and 3B, the training module 220 could access a thesaurus to obtain synonyms for the word "erase" and thereby generate additional example expressions "eliminate", "annul" and "expunge" and "blot" for the machine-executable instruction 310 "delete". It is contemplated that a resource 230 could be stored locally in the training module 220, and/or coupled to the training module 220 via the communication network 110. In some implementations, the training module 220 is coupled to a web-crawling module to obtain information therefrom. In some implementations, the generation of additional example expressions 330 by the training module 220 could be initiated by the occurrence of a web-crawling event operation.

In some implementations, a generated additional example expression 330 is presented to the training administrator for validation. The generated additional example expression 330 is presented to the training administrator via the communication interface 240. The training administrator then evaluates the generated example expression 330 and rates it as valid or invalid. It is contemplated that the validation for the generated additional example expression 330 could be provided in the form of a validity rating on a scale having more than two possible values.

In some implementations of the method 600, the additional example expression 330 generated by the training module 220 for a particular machine-executable instruction 310 is included in the plurality of example expressions 320 received therefor (from the training administrator) responsive to the validation received from the training administrator for that generated additional example expression 330. Thus, in the exemplary scenario for the machine executable instruction 310 "delete", the generated additional example expressions 330 "eliminate", "annul" and "expunge" and "blot" are presented to the training administrator. In this exemplary scenario, the validation received from training administrator for the generated example expression 330 "eliminate" could be indicative of its validity, or indicative of it being above a threshold validity level. Responsive to the receipt of the positive validation from the training administrator, the generated example expression 330 would be included in the plurality of expressions 320 associated with the machine-executable instruction 310 "delete".

In some implementations, all of the additional example expression 330 generated by the training module 220 for a particular machine-executable instruction 310 are included in the plurality of example expressions 320 along with the corresponding validation thereof. Thus, each additional example expression 330 is included with the plurality of example expressions 320 regardless of its validation being positive or negative, or the validity rating. In some implementations, the validation of the additional example expression 330 is associated the additional example expression 330. The validation of the additional example expression 330 may be included as a feature 400 for the additional example expression 330. Thus, the plurality of example expressions, in this implementation, could include example expressions 320 that are invalid or inoperative for describing the corresponding machine executable instruction. This information related to invalid or inoperative example expressions is used to increase the accuracy of the processing of a user-generated command 300 to a machine-executable instruction 310. The inclusion of the invalid or inoperative example expression reduces errors in the conversion of a user-generated command 300 to a machine-executable instruction 310 by providing the dictation application 150 with instances of inoperative or invalid usages of the machine-executable instruction 310.

In some implementations, the plurality of example expressions 320 for a machine executable instruction 310 is sorted in descending order of proximity to the corresponding machine-executable instruction 310. Thus, in some implementations, a proximity parameter is determined for each example expression with respect to the corresponding machine-executable instruction 310.

It should be understood that although the descriptions was provided with reference to English language examples, it should be understood that the methods and systems described above are not limited to being implemented for any one language. The methods and systems described above can be implemented in any language and can also be implemented in more than one language.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of processing a user-generated input command, the method being executable at a server, and comprising:
in a training phase:
receiving, by the server, a plurality of example expressions, the example expressions corresponding to a plurality of different natural language expressions of the user-generated input command associated with a machine-executable instruction,
the plurality of different natural language expressions being in a form of user-generated speech received from a user, and having been converted into a text data for detecting the user-generated input command embedded therein;
generating, by the server, features for each of the plurality of different natural language expressions, the features being based on morphological and lexicographical analysis of the plurality of different natural language expressions;
executing, by the server, a pattern mining algorithm, the pattern mining algorithm being a Charm Bitset algorithm, configured to determine one or more feature patterns associated with the features of the machine-executable instruction, the one or more feature patterns being indicative of an occurrence of features of the machine-executable instruction that corresponds to the plurality of different natural language expressions of the user-generated command;
storing, by the server, the one or more feature patterns associated with the machine-executable instruction in a feature pattern database;
in an in-use phase:
receiving, from a client device, an in-use user-generated input command;
generating features for the in-use user-generated input command, the features being based on morphological and lexicographical analysis of the in in-use user-generated input command;
using the one or more feature patterns stored in the feature pattern database to determine, which machine-executable instruction, the in in-use user-generated input command corresponds to, in order to convert the in-use user-generated input command into a machine-executable output instruction;
transmitting, by the server, the machine-executable output instruction to the client device to execute the in-use user-generated input command.

2. The method of claim 1, wherein said generating comprises:
obtaining, by the server, an occurrence count for each of the plurality of features; and
analyzing, by the server, the plurality of features after discarding therefrom, a low occurrence feature of the plurality of features, the low occurrence feature having an occurrence count being smaller than a threshold occurrence count.

3. The method of claim 1, wherein said generating the features for each one of the plurality of example expressions comprises:
generating, by the server, the plurality of features based on a predetermined rule.

4. The method of claim 1, wherein said generating the plurality of features for each one of the plurality of example expressions comprises:
generating the plurality of features based on a statistical model, wherein the statistical model is on of:
a Hidden Markov Model; and
conditional random field model.

5. The method of claim 1, further comprising:
generating, by the server, an additional example expression for the machine-executable instruction; and
including the generated additional example expression in the plurality of example expressions for the machine-executable instruction.

6. The method of claim 5, further comprising, before including the generated additional example expression in the plurality of example expressions:
presenting, by the server, the generated additional example expression to a training administrator; and
responsive to said presenting, receiving, by the server, from the training administrator, a validation for the generated additional example expression, the validation being indicative of a validity of the generated additional example expression.

7. The method of claim 6, wherein said including the generated additional example expression in the plurality of example expressions is further responsive to:
   the validation being indicative of the generated additional example expression being a valid expression.

8. The method of claim 6, wherein said including the generated additional example expression in the plurality of example expressions comprises:
   associating, by the server, on received for the generated additional example expression with the generated additional example expression.

9. The method of claim 5, wherein said generating of the additional example expression comprises:
   accessing, by the server, an external resource communicatively coupled with the computing apparatus.

10. The method of claim 9, wherein the server is further coupled to a crawling application, and wherein the method comprises:
    crawling the network resource to obtain information for generating the additional example expression.

11. The method of claim 1, wherein the feature associated with one of the plurality of expressions is indicative of one of:
    a grammar element;
    a root of a word related to the example expression;
    a normalized form of the word;
    a punctuation element;
    a word separator; and
    a command.

* * * * *